July 12, 1949.　　　　T. ZINTSMASTER　　　2,476,173
RESILIENT WHEEL
Filed Feb. 7, 1945　　　　　　　　　　　　2 Sheets-Sheet 1

INVENTOR
TIM ZINTSMASTER
BY Clarence D Kerr
ATTORNEY

July 12, 1949.
T. ZINTSMASTER
2,476,173
RESILIENT WHEEL
Filed Feb. 7, 1945
2 Sheets-Sheet 2
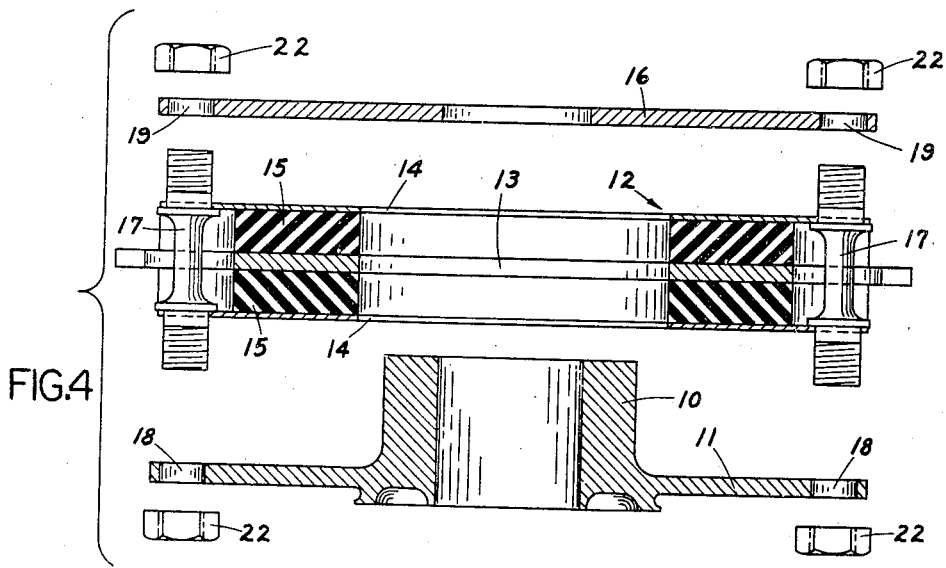
FIG.4
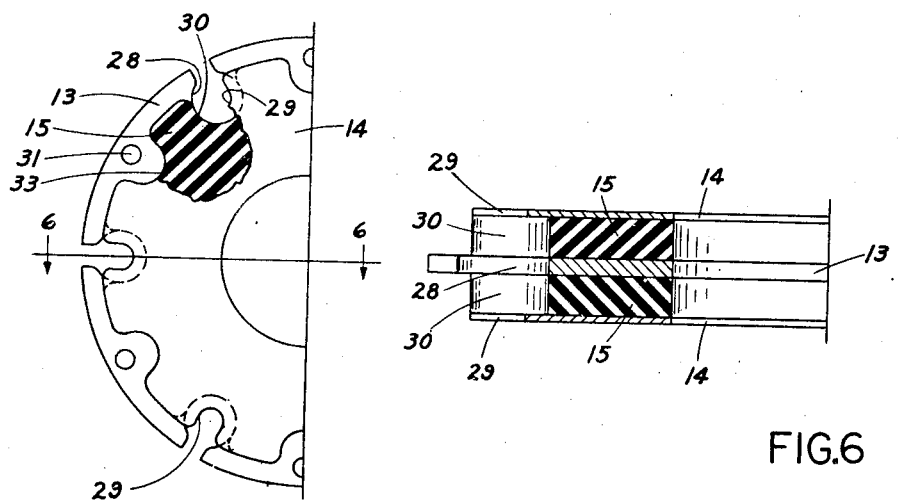
FIG.5
FIG.6
INVENTOR
TIM ZINTSMASTER
BY
Clarence D. Kerr
ATTORNEY Patented July 12, 1949

2,476,173

UNITED STATES PATENT OFFICE 2,476,173

RESILIENT WHEEL

Tim Zintsmaster, Cleveland, Ohio, assignor to National Malleable and Steel Castings Company, Cleveland, Ohio, a corporation of Ohio Application February 7, 1945, Serial No. 576,571

7 Claims. (Cl. 295—11)

The invention relates in general to vehicle wheels and in particular to resilient wheels for railway cars.

Considerable effort has been directed to the development of railway car wheels having rubber compression or shear members to provide resilience, absorb vibrations and afford quieter operation by deadening sound transmission from the metal tire to the car truck, underframe and body. Many patents have been issued in this field, and, as examples of the closest prior art of which I am aware, attention is directed to the patents: Burrows et al. Re. 22,107 and Patch 2,014,360. The present invention is directed to overcoming certain very important disadvantages of the wheels shown in these patents, and of other wheels which have been known or used heretofore.

There are two particular problems which are not solved very well by any of the prior constructions. One is the provision of a wheel having a cushioning unit which can be easily and cheaply vulcanized, and the other is the achievement of a wheel construction which will meet all of the practical requirements as to ease of assembly and disassembly for replacement of parts. It has been a special object of my invention to provide a construction which combines ease of vulcanization with facility of assembly and parts replacement.

Patch, supra, proposed to vulcanize rubber members directly to heavy wheel plates which is quite impractical because of the difficulty and expensiveness of vulcanizing through the heavy plates which form the body of the wheel. Burrows et al., supra, offered a partial solution to this problem by vulcanizing each rubber member to thin metal plates which in turn were fastened to the heavy wheel and rim plates. This, however, led to a complicated and rather expensive construction, required two separate vulcanizing operations, and made it practically impossible to use a detachable tire. My invention is intended to overcome these and other disadvantages of prior wheel constructions.

It is an object of my invention to provide an improved resilient wheel and cushioning unit therefor. Other objects and advantages will appear as the description proceeds. In the drawings:

Fig. 1 is a rear elevational view of the lower half of a railway car wheel embodying my invention in a preferred form. It will be understood that the upper half of the wheel simply duplicates the lower half. Hence, that the scale of the drawing may be larger, only the one half is shown.

Fig. 4 is an exploded view of the wheel shown in the preceding views, the parts being shown in cross section at the center-line.

Fig. 5 is a detail plan view of the cushioning unit, with one of the securing discs partly broken away to reveal one of the rubber members; and Fig. 6 is an enlarged cross section on the line 6—6 of Fig. 5.

Figure 1:
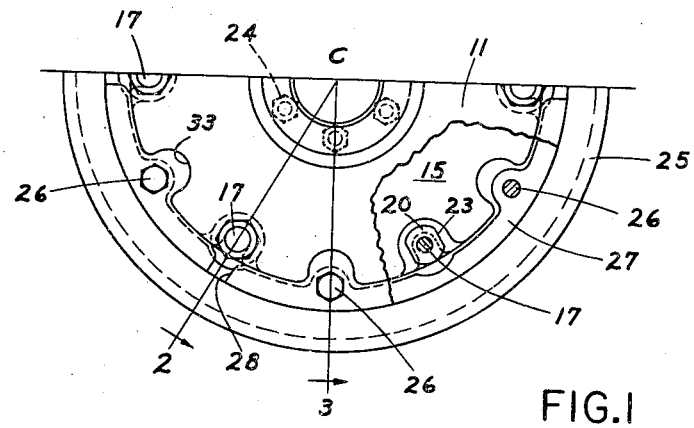
Figure 2:
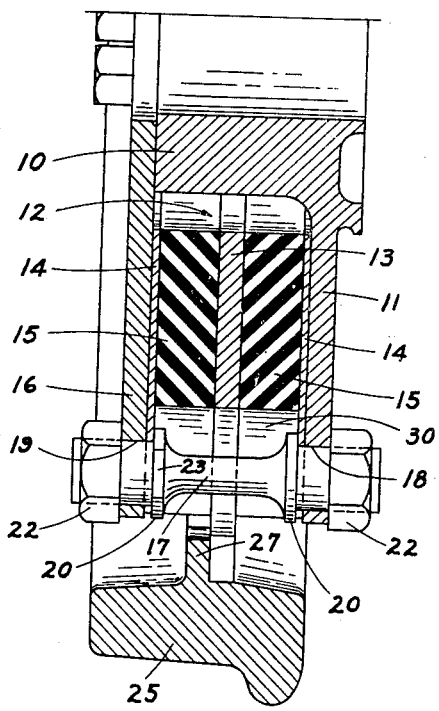
Figs. 2 and 3 are enlarged cross sectional views taken on the lines C—2 and C—3, respectively, of Fig. 1.

With reference to the drawings, and more particularly Fig. 2, the wheel illustrated, in its general arrangement, comprises a hub portion 10 having fixed thereto a radially extending flange such as the integral flange 11, a cushioning unit 12 having an annular central supporting plate 13 and two annular securing discs 14 with an annular rubber member 15 between each securing disc and the central supporting plate and vulcanized to both, an outer supporting plate 16 arranged to be secured to the hub 10 in position to embrace the cushioning unit 12 between the outer supporting plate and the hub flange 11. Spacer bolts 17 are arranged to pass through apertures 18 and 19 in the hub flange 11 and outer supporting plate 16, respectively, adjacent the outer periphery of the cushioning unit.

With further reference to Fig. 2, it will be observed that the spacer bolts 17 are provided with flanges 20 affording spacing means between the securing discs. The nuts 22 clamp the peripheries of the securing discs 14 securely between the flanges 20 of the spacer bolts and the hub flange and outer supporting plate respectively. One or both of the flanges 20 of the spacer bolts may be provided with flats as at 23 for engagement by a wrench.

Figure 3:
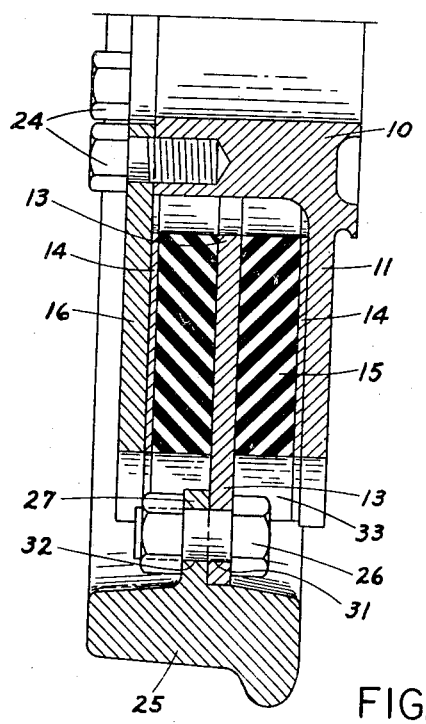

I have referred above to the fact that the outer supporting plate 16 is arranged to be secured to the hub portion 10. Referring now to Fig. 3, I have indicated the use of stud bolts 24 for this purpose. The tire 25 is removably attached to the central supporting plate 13 as by means of bolts 26 passing through apertures 31 and 32 in the periphery of the supporting plate and in the inwardly extending annular flange 27 fixed to the tire.

I refer now to Figs. 5 and 6, which are detail views of the cushioning unit 12. This unit, as we have seen, comprises the central supporting plate 13 and two securing discs 14 with a rubber member 15 between each securing disc and the central supporting plate and vulcanized to both. A series of aligned recesses 28, 29 and 30 are formed in the central supporting plate 13, securing discs 14 and rubber members 15, respectively, through which pass the spacer bolts 17. The recesses or slots 29 in the securing discs 14 are arranged to receive the ends of the spacer bolts wtih the flanges 20 thereof bearing against the securing discs around the sides of the slots. The recesses 28 and 30 in the central supporting plate and rubber members provide sufficient clearance for the spacing bolts to allow relative movement between the central supporting plate and the members which are secured or fixed to the hub portion of the wheel, i. e., securing discs 14, flange 11 and outer supporting plate 16. This relative movement occurs through deformation of the rubber members, affording resilience and providing quieter operation by deadening sound transmission from the metal tire to the car truck, underframe and body. The rubber members and securing discs are provided with a second series of recesses 33 arranged between the recesses 30, allowing sufficient clearance for the tire bolts 26 during the relative movement just described. It will be observed that the central supporting plate 13 has a series of alternating recesses and apertures 28 and 31, respectively, for spacing and tire attaching means, and that the peripheries of the securing discs 14 and rubber members 15 likewise are recessed for both the spacing and tire attaching means.

With particular reference to Fig. 4, I shall now describe the method of assembling the wheel. The cushioning element 12 will first have been manufactured as a unit, the rubber members 15 being vulcanized to the central supporting plate 13 and securing discs 14. Spacer bolts 17 are inserted into the slots of the cushioning unit. The cushioning unit may then be dropped over the hub member 10, 11 and the outer supporting plate 16 dropped over the upper ends of the spacer bolts. Thereafter the nuts 22 are applied to the spacer bolts and tightened, clamping the securing plates of the cushioning unit tightly to the supporting flange 11 and supporting plate 16 adjacent their respective peripheries. The tire 25 may then be secured to the periphery of the central supporting plate 13.

Alternatively, the tire can be secured to the cushioning unit prior to assembly of the latter with the other wheel elements.

The construction which I have described provides a cushioning unit which can be easily and cheaply vulcanized and which, further, provides facility of assembly. Furthermore, it makes possible the use of a detachable tire while adequate clearance is provided for the tire attaching bolts without any substantial increase in the radial width of the felloe and without reducing the overall radial dimensions of the rubber members.

The terms and expressions which I have employed are used in a descriptive and not a limiting sense, and I have no intention of excluding such equivalents of the invention described, or of portions thereof, as fall within the purview of the claims.

I claim:

1. A resilient wheel comprising a hub portion having fixed thereto a radially extending flange, a cushioning unit having a single annular central supporting plate and two annular securing discs with an annular rubber member between each securing disc and the central supporting plate and vulcanized to both, an outer supporting plate arranged to be secured to said hub portion in position to embrace the cushioning unit between the outer supporting plate and the hub flange, and spacer bolts arranged to pass through the hub flange and outer supporting plate adjacent the perihphery of the cushioning unit, the single central supporting plate being arranged for removable attachment to one side of a tire flange.

2. A resilient wheel comprising a hub portion having fixed thereto a radially extending flange, a cushioning unit having a single annular central supporting plate and two annular securing discs with an annular rubber member between each securing disc and the central supporting plate and vulcanized to both, an outer supporting plate arranged to be secured to said hub portion in position to embrace the cushioning unit between the outer supporting plate and the hub flange, and spacer bolts arranged to pass through the hub flange and outer supporting plate adjacent the periphery of the cushioning unit, the periphery of the rubber members having recesses for tire securing means, and the single central supporting plate being arranged for removable attachment to one side of a tire flange.

3. A resilient wheel comprising a hub portion having fixed thereto a radially extending flange, a cushioning unit having a single annular central supporting plate and two annular securing discs with an annular rubber member between each securing disc and the central supporting plate and vulcanized to both, an outer supporting plate arranged to be secured to said hub portion in position to embrace the cushioning unit between the outer supporting plate and the hub flange, and spacer bolts arranged to pass through the hub flange and outer supporting plate adjacent the periphery of the cushioning unit, the single central supporting plate being arranged for removable attachment to one side of a the flange by bolts arranged between said spacer bolts.

4. A resilient wheel as defined in claim 1, in which the peripheries of the rubber members, central supporting plate and securing discs are recessed for radial insertion of the spacer bolts into the vulcanized cushioning unit.

5. A cushioning unit for a resilient wheel comprising an annular central supporting plate and two annular securing discs with an annular rubber member between each securing disc and the central supporting plate and vulcanized to both, the periphery of the central supporting plate having a series of alternating recesses and apertures for spacing and tire attaching means, and the peripheries of the securing discs having recesses opening radially outward for both the spacing and tire attaching means.

6. A cushioning unit for a resilient wheel comprising an annular central supporting plate and two annular securing discs with an annular rubber member between each securing disc and the central supporting plate and vulcanized to both, the periphery of the central supporting plate having a series of alternating recesses and apertures for spacing and tire attaching means, and the peripheries of the securing discs and rubber members having recesses opening radially outward for both the spacing and tire attaching means.

7. A cushioning unit for a resilient wheel comprising an annular central supporting plate of substantial strength and rigidity capable of withstanding the lateral and radial forces to which a wheel is subjected and two annular securing discs for attachment to the wheel hub flange and to an outer supporting plate with an annular rubber member between each securing disc and the central supporting plate and vulcanized to both, the peripheries of the securing discs being recessed for radial insertion of spacer bolts to secure said discs to the wheel hub flange and to the outer supporting plate, said supporting plate also having its periphery recessed for radial insertion of said spacer bolts and having apertures for receiving means for securing said plate to one side of a tire flange.

TIM ZINTSMASTER.

REFERENCES CITED

The following references are of record in the file of this patent:

UNITED STATES PATENTS

| Number | Name | Date |
| --- | --- | --- |
| 2,168,900 | Eaton | Aug. 8, 1939 |
| 2,290,661 | Williams | July 21, 1942 |
| 2,295,270 | Piron | Sept. 8, 1942 |
| 2,390,290 | Beebe | Dec. 4, 1945 |
| 2,439,906 | Piron | Apr. 20, 1948 |

Certificate of Correction

Patent No. 2,476,173                                                           July 12, 1949

TIM ZINTSMASTER

It is hereby certified that errors appear in the printed specification of the above numbered patent requiring correction as follows:

Column 3, line 8, for "wtih" read *with*; column 4, line 7, for "perihphery" read *periphery*; line 41, for "the flange" read *tire flange*;

and that the said Letters Patent should be read with these corrections therein that the same may conform to the record of the case in the Patent Office.

Signed and sealed this 17th day of January, A. D. 1950.

[SEAL]

THOMAS F. MURPHY,
*Assistant Commissioner of Patents.*